US011925521B2

(12) United States Patent
Berger (10) Patent No.: US 11,925,521 B2
(45) Date of Patent: Mar. 12, 2024

(54) DENTAL BRIDGE SYSTEM WITH INSERT (71) Applicant: POETYA SOLUTIONS LIMITED, Victoria (SC)

(72) Inventor: Uzi Berger, Hod Hasharon (IL)

(73) Assignee: POETYA SOLUTIONS LIMITED, Victoria (SC)

( * ) Notice: Subject to any disclaimer, the term of this patent is extended or adjusted under 35 U.S.C. 154(b) by 24 days.

(21) Appl. No.: 16/079,041

(22) PCT Filed: Feb. 26, 2017

(86) PCT No.: PCT/IL2017/050241
§ 371 (c)(1),
(2) Date: Aug. 22, 2018

(87) PCT Pub. No.: WO2017/145168
PCT Pub. Date: Aug. 31, 2017

(65) Prior Publication Data
US 2019/0046306 A1 Feb. 14, 2019

Related U.S. Application Data (60) Provisional application No. 62/299,681, filed on Feb. 25, 2016.

(51) Int. Cl.
*A61C 13/00* (2006.01)
*A61C 8/00* (2006.01)
(Continued)

(52) U.S. Cl.
CPC ........ *A61C 13/0025* (2013.01); *A61C 8/0009* (2013.01); *A61C 8/0027* (2013.01);
(Continued)

(58) Field of Classification Search
CPC . A61C 13/0025; A61C 8/0009; A61C 8/0027; A61C 8/0048; A61C 8/005; A61C 8/0086; A61C 8/0095; A61C 13/225
See application file for complete search history.

(56) References Cited

U.S. PATENT DOCUMENTS 4,767,328 A * 8/1988 Branemark .......... A61C 8/0048
433/168.1
4,784,608 A * 11/1988 Mays ................... A61C 8/0048
433/172
(Continued)

FOREIGN PATENT DOCUMENTS

EP 0210967 A2 2/1987
EP 0622053 A2 11/1994
(Continued)

OTHER PUBLICATIONS

International Search Report and Written Opinion for PCT/IL2017/050241 ated May 17, 2017.
U.S. Appl. No. 62/127,864, filed Apr. 3, 2015.

*Primary Examiner* — Ralph A Lewis
(74) *Attorney, Agent, or Firm* — The Roy Gross Law Firm, LLC; Roy Gross (57) ABSTRACT A dental bridge system (10) is provided, comprising a superstructure (14) having a teeth-mimicking portion at a distal end thereof, and at least one receiving cavity formed on a proximal side thereof, at least one support arrangement (12) configured for being fixedly secured, at a proximal side thereof, to an alveolar ridge of an individual, and being formed so as to be received, at a distal side thereof, within one of the receiving cavities to facilitate carrying of the superstructure (14), and a buffering arrangement (16) disposed between the superstructure (14) and the support arrangement (12), the buffer arrangement (16) being con-
(Continued)

figured to damp shock impulses between the support arrangement (12) and the superstructure (14).

19 Claims, 5 Drawing Sheets (51) Int. Cl.
    *A61C 13/07*     (2006.01)
    *A61C 13/225*     (2006.01)

(52) U.S. Cl.
    CPC ............ *A61C 8/0048* (2013.01); *A61C 8/005* (2013.01); *A61C 8/0086* (2013.01); *A61C 8/0095* (2013.01); *A61C 13/225* (2013.01)

(56) References Cited

U.S. PATENT DOCUMENTS

| | | | | |
|---|---|---|---|---|
| 4,931,016 A * | 6/1990 | Sillard | ................. | A61C 8/0048 |
| | | | | 433/167 |
| 5,133,662 A | 7/1992 | Metcalfe | | |
| 5,554,027 A * | 9/1996 | Branemark | .......... | A61C 8/0048 |
| | | | | 433/169 |
| 5,927,980 A * | 7/1999 | Sillard | ................. | A61C 8/0048 |
| | | | | 433/173 |
| 8,529,260 B2 * | 9/2013 | Berger | ............... | A61C 13/0001 |
| | | | | 433/172 |
| 9,055,993 B2 * | 6/2015 | Grobbee | .............. | A61C 8/0048 |
| 9,795,458 B2 * | 10/2017 | Llop | ....................... | A61C 1/084 |
| 2006/0223029 A1 * | 10/2006 | Berger | ................. | A61C 13/275 |
| | | | | 433/172 |
| 2009/0325125 A1 * | 12/2009 | DiAngelo | .......... | A61C 13/0004 |
| | | | | 433/173 |
| 2013/0323679 A1 | 12/2013 | Berger | | |
| 2015/0164620 A1 | 6/2015 | Berger | | |
| 2016/0081776 A1 * | 3/2016 | Fah | .................... | A61C 13/2656 |
| | | | | 433/167 |

FOREIGN PATENT DOCUMENTS

| | | |
|---|---|---|
| SU | 1528476 A1 | 12/1989 |
| WO | 2000027556 | 5/2000 |
| WO | 2006103648 | 10/2006 |
| WO | 2011030342 A3 | 3/2011 |
| WO | 2012049672 | 4/2012 |
| WO | 2013021386 | 2/2013 |
| WO | 2016113737 | 7/2016 |

* cited by examiner

DENTAL BRIDGE SYSTEM WITH INSERT

TECHNOLOGICAL FIELD

The present disclosure is directed to a dental bridge system. More particularly, the presently disclosed subject matter relates to a dental bridge system having a readily detachably-attachable superstructure.

BACKGROUND

Partial or complete loss of an individual's natural teeth, either or both at the upper and lower jaw, due to age, injury, disease, or any other reasons may have a negative impact, for example functionally and/or socially.

Dental implant systems are commonly used to provide artificial teeth, by providing teeth- and/or gum-mimicking implants in place of the missing teeth. Such system typically comprise a support system, such as a support bar or one or more abutments, which are fixed to the alveolar ridge of an individual, and a superstructure mounted thereon, which includes the mimicking portions. The superstructure is often removable by the individual, for example to facilitate cleaning, repair, replacement, etc. The support system may be directly affixed to the individual, or attached to dental implants within the alveolar ridge.

SUMMARY

According to one aspect of the presently disclosed subject matter, there is provided a dental bridge system comprising:
  a superstructure having a teeth-mimicking portion at a distal end thereof, and at least one receiving cavity formed on a proximal side thereof;
  at least one support arrangement configured for being fixedly secured, at a proximal side thereof, to an alveolar ridge of an individual, and being formed so as to be received, at a distal side thereof, within one of the receiving cavities to facilitate carrying of the superstructure; and
  a buffering arrangement disposed between the superstructure and the support arrangement, the buffering arrangement being configured to damp shock impulses between the support arrangement and the superstructure.

An outer surface of the buffering arrangement may be shaped so as to conform to the shape of a contacting surface of the receiving cavity of the superstructure, e.g., ensuring a tight and/or snug fit therebetween. An inner surface of the buffering arrangement may be shaped so as to conform to the shape of a contacting surface of the support arrangement, e.g., ensuring a tight and/or snug fit therebetween.

The buffering arrangement may comprise a buffer insert, corresponding to each of at least one of the receiving cavities, and separate from the superstructure and support arrangement. The buffer insert may comprise a secondary receiving cavity configured to receive therein the support structure.

The buffer insert may be made of a polymer material. The polymer material may comprise polyetheretherketone (PEEK), polyisocyanurate, and/or polyaryletherketone (PAEK).

The buffer insert may be made of titanium

The buffer insert may be made from a material different from that of at least one of the superstructure and the support structure.

The buffering arrangement may further comprise an auxiliary buffer insert nested within each of at least one of the buffer inserts.

An inner surface of the buffer insert may be shaped so as to conform to a contacting outer surface of its corresponding auxiliary buffer insert.

The buffering arrangement may be flush with proximal surfaces of the superstructure and support arrangement when the system is fully assembled.

The dental bridge system may further comprise a locking system having at least one locking pin for passing through the superstructure and support structure, the buffering arrangement comprising an aperture for passage therethrough of the pin. The buffering arrangement may comprise an outwardly-projecting locking housing for receipt therethrough of the pin, the superstructure comprising a corresponding cutout to accommodate passage therethrough of the locking housing when the buffering arrangement is fully received within the receiving aperture.

The buffering arrangement may be formed by application of a solvent-carrying polymer on the receiving cavity of the superstructure. The dental bridge may be formed by application of a solvent-carrying polymer on an outer surface of the support structure.

The buffering arrangement may comprise labial and lingual buffering surfaces. The buffering arrangement may be free of a distal buffering surface, with the labial and lingual buffering surfaces being connected by one or more connecting members passing over the distal surface. The buffering arrangement may comprise a distal buffering surface.

The support structure may comprise a support bar formed to substantially follow at least a portion of the alveolar ridge.

The support structure may comprise a plurality of abutments configured for being fixedly secured to the alveolar ridge. Each of the abutments may be configured for being secured to a dental implant. Each of the abutments may constitute a distal portion of a dental implant.

The superstructure may constitute a partial denture.

According to another aspect of the presently disclosed subject matter, there is provided a buffering arrangement for the dental bridge system as described above.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

As illustrated in FIGS. 1A through 2C (not all elements listed below are visible/indicated in all of the figures), there is provided a dental bridge system, which is generally indicated at 10. The system 10 comprises a support arrangement such as a support bar 12 carrying and receivable within a removable superstructure 14. The system 10 further comprises a buffering arrangement, for example comprising a buffer insert 16, disposed between the support bar 12 and the superstructure 14.

It will be appreciated that while the dental bridge system 10 described herein with reference to the accompanying drawings relates to a full denture, the system may be provide in accordance with the presently disclosed subject matter as a partial denture, mutatis mutandis.

The support bar 12 is configured for fixedly securing to a jawbone (either the upper maxillary jawbone, or the lower mandibular jawbone; not illustrated) of an individual, i.e., to the individual's alveolar ridge above the gingival mucosa. Accordingly, it may be formed so as to follow a general arcuate shape of the jawbone, and comprises an internal lingual surface 20, an external labial surface 22, a distal surface 24, and a proximal surface 26 (herein the present disclosure and appended claims, the terms "distal" and "proximal" refers to the relative positions with respect to the jawbone when affixed thereto). The lingual, labial, and distal surfaces 20, 22, 24 of the support bar 12 constitute contacting surfaces thereof.

The support bar 12 may be made of any rigid, metallic or non-metallic material, including, but not limited to, gold, titanium, chrome-cobalt, a suitable form of zirconium, porcelain, plastic, acrylic, or polymeric materials, composite materials, glass, carbon, materials reinforced with glass and/or carbon fibers, natural stone, silicates, silicon, and combinations thereof.

In order to facilitate securing of the support bar 12 to the jawbone, a plurality of dental implants (not illustrated) may be provided. The implants may comprise an integrated abutment portion projecting above the gum, they may comprise a separate abutment attached thereto, and/or they may be provided in accordance with any other suitable design, for example as is well-known in the art. Accordingly, the support bar 12 may comprise a plurality of proximally-facing bores 30, for example each formed within a positioning post 32 of the support bar 12.

Suitable fastening elements (not illustrated), such as screws, may be provided to secure the mounting bar 12 to the dental implants. Apertures 34 may thus be provided between the distal surface 24 of the support bar 12 and each of the bores 30, facilitating manipulation of each of the fastening elements by accommodating insertion therethrough of a suitable tool (not illustrated), e.g., for screwing/unscrewing thereof.

According to some examples, the distal surface 24 of the support bar 12 is substantially flat and smooth over at least a portion of its length. According to other examples, the distal surface 24 is rough over at least a portion thereof. According to further examples, the distal surface 24 is formed with small projections and/or recesses therealong (not illustrated). It will be appreciated that the distal surface 24 may be formed according to more than one of the above examples.

The superstructure 14 constitutes a crown portion of the system 10. Accordingly, it is similarly formed so as to follow the general arcuate shape of the jawbone, and comprises an internal lingual surface 36, an external labial surface 38, and a proximal surface 40. It further comprises a distal teeth-mimicking portion 42, e.g., designed to mimic dental parameters (for example including, but not limited to, one or more of shape, size, color, texture, and imperfections) of the individual's natural teeth. It may further comprise a proximally-disposed gum-mimicking portion 44. The teeth- and gum-mimicking portions 42, 44 may be provided according to any suitable design, for example as is well-known in the art.

The proximal surface 40 of the superstructure 14 is formed with one or more proximally-facing receiving cavities, such as a channel 46 designed (e.g., having a suitable shape and size) so as to fit over at least a portion of the support bar 12 and buffer insert 16. In addition, one or more lock-housings 48 project internally from the lingual surface 36 of the superstructure 14, to accommodate a locking mechanism (not illustrated) configured to secure the superstructure in place over the support bar 12 when received within the channel 46.

According to some examples, the system 10 is configured for use with a pin-type locking mechanism, wherein the lock-housings 48 may each be formed as a cylindrical projection defining a bore 50 passing therethrough, terminating in a through-going aperture 52 connecting the bore 50 and the channel 46. The lingual surface 20 of the support bar 12 is formed with a corresponding aperture 54, configured to align with the aperture 52 formed in the lingual surface 36 of the superstructure 14. According to some modifications, the aperture 54 formed in the support bar 12 is through-going (i.e., passing through to the labial surface 22 of the support bar), and auxiliary apertures 56 are formed in labial surface 38 of the superstructure 14, configured to align with labial-facing openings the apertures 54 of the support bar. Such a construction may be useful, e.g., to facilitate pushing a locking pin passing through apertures 52, 54 in a lingual direction by insertion, through aperture 56, of a thin member, such as a paper clip, etc.

As mentioned above, the buffer insert 16 is disposed between the support bar 12 and the superstructure 14 when the support bar is received within the channel 46. It may serve as a buffer between the support bar 12 and superstructure 14, for example absorbing/cushioning forces therebetween, i.e., damping shock impulses which would otherwise occur from contact between the support bar 12 and the superstructure 14, in particular when received within the channel 46 thereof. According to some examples, it comprises an exterior labial panel 58, an interior lingual panel 60, and a distal panel 62, defining a channel 64 therebetween.

The buffer insert 16 may be made of any suitable material, for example allowing it to be formed with high precision (i.e., with low or zero tolerance), thereby facilitating a tight fit between it and the support bar 12, and between it and the superstructure 14. The material may be suitable for machining, for example to a required level of precision. In addition, the material may be selected so as to be more flexible and/or to provide a higher degree of shock damping than either or both of the support bar 12 and superstructure 14. According to some examples, it is made of polyisocyanurate, polyaryletherketone (PAEK), polyetheretherketone (PEEK), or any other polymer which is suitable for being shaped by machining. According to other examples, it is made of titanium.

In order to facilitate maintaining a tight fit between the support bar 12 and the superstructure 14, an outer surface of the buffer insert 16 may be formed so as to conform to the geometry of the channel 46 formed in the superstructure 14. In addition, the channel 64 may formed so as to conform to the geometry of the contacting surfaces 20, 22, 24 of the support bar 12.

The buffer insert 16 may be further designed to cooperate with the support bar 12 and superstructure 14 to facilitate securing the superstructure in place over the support bar. Accordingly, it may comprise apertures 66 formed in the lingual panel 60 thereof, configured to align with the apertures 52 formed in the superstructure 14, and with lingual-facing openings of the apertures 54 formed in the support bar 12. According to the modification described above wherein the superstructure 14 is formed with auxiliary apertures 56, the buffer insert further comprises auxiliary apertures 68 formed in the labial panel 58 thereof, configured to align with the auxiliary apertures 56 formed in the superstructure, and with labial-facing openings of the apertures 54 formed in the support bar 12.

Figure 1A:
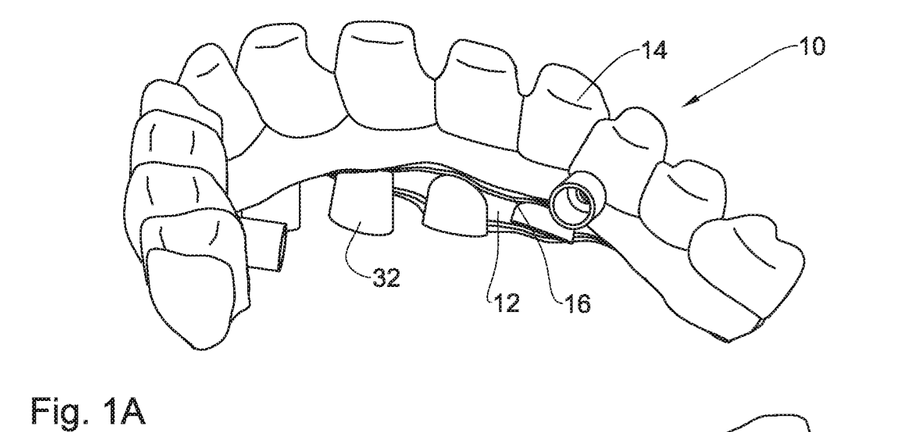
FIG. 1A is rear top perspective view of an example of a dental bridge system according to the presently disclosed subject matter.
Figure 1B:
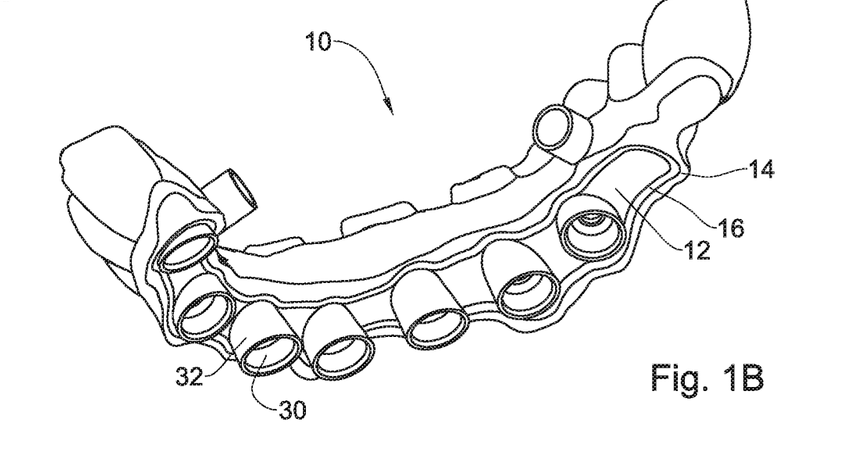
FIG. 1B is a rear bottom perspective view of the dental bridge system illustrated in FIG. 1A.
Figure 1C:
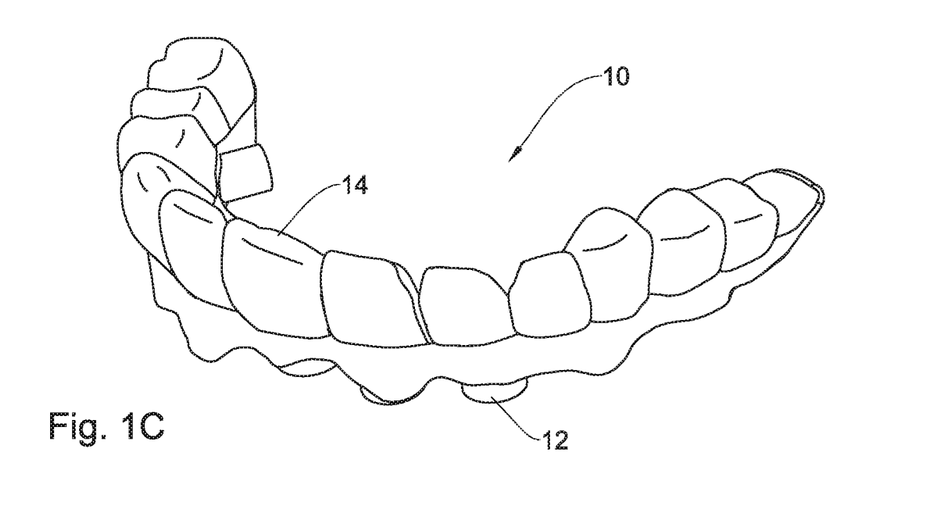
FIG. 1C is a front top perspective view of the dental bridge system illustrated in FIG. 1A.
Figure 2A:
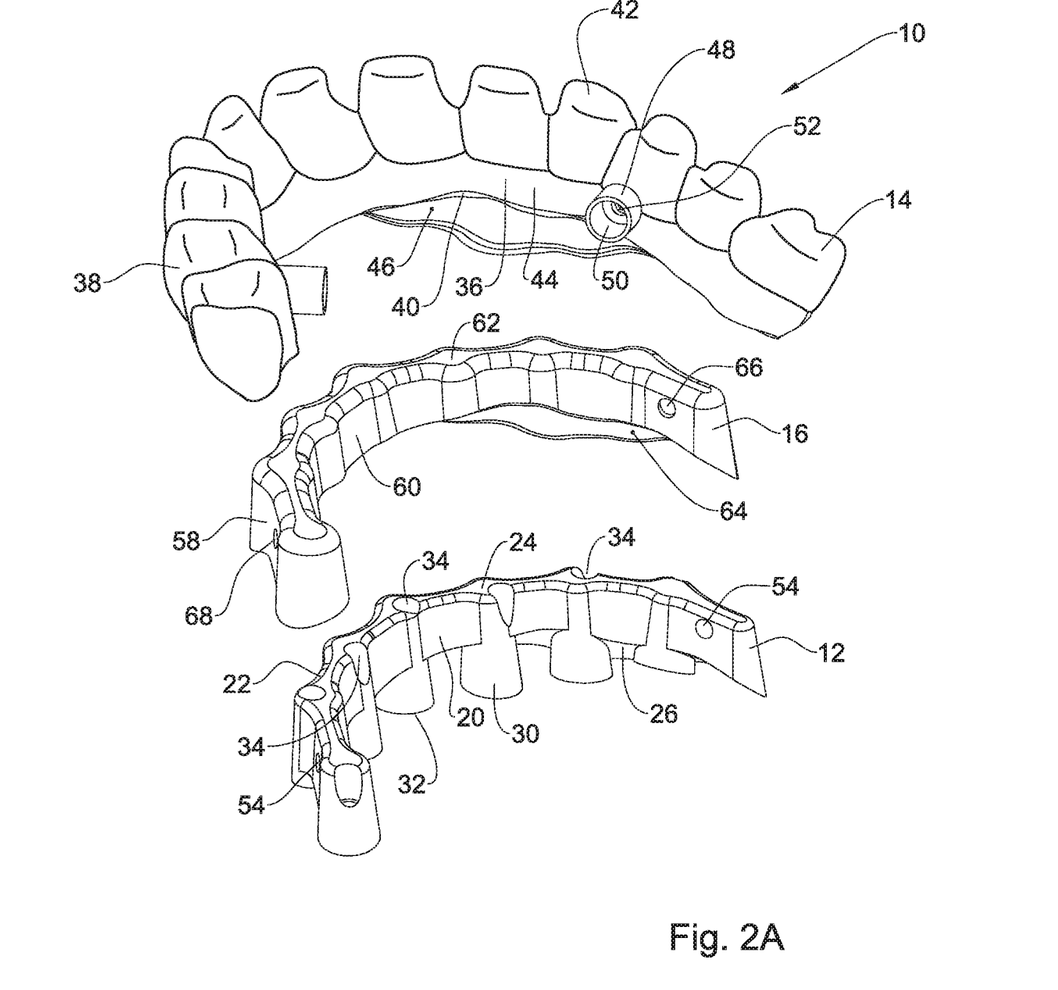
FIGS. 2A through 2C are exploded views of the dental bridge system illustrated in FIG. 1A, shown in the views illustrated in, respectively, FIGS. 1A through 1C.
Figure 2B:
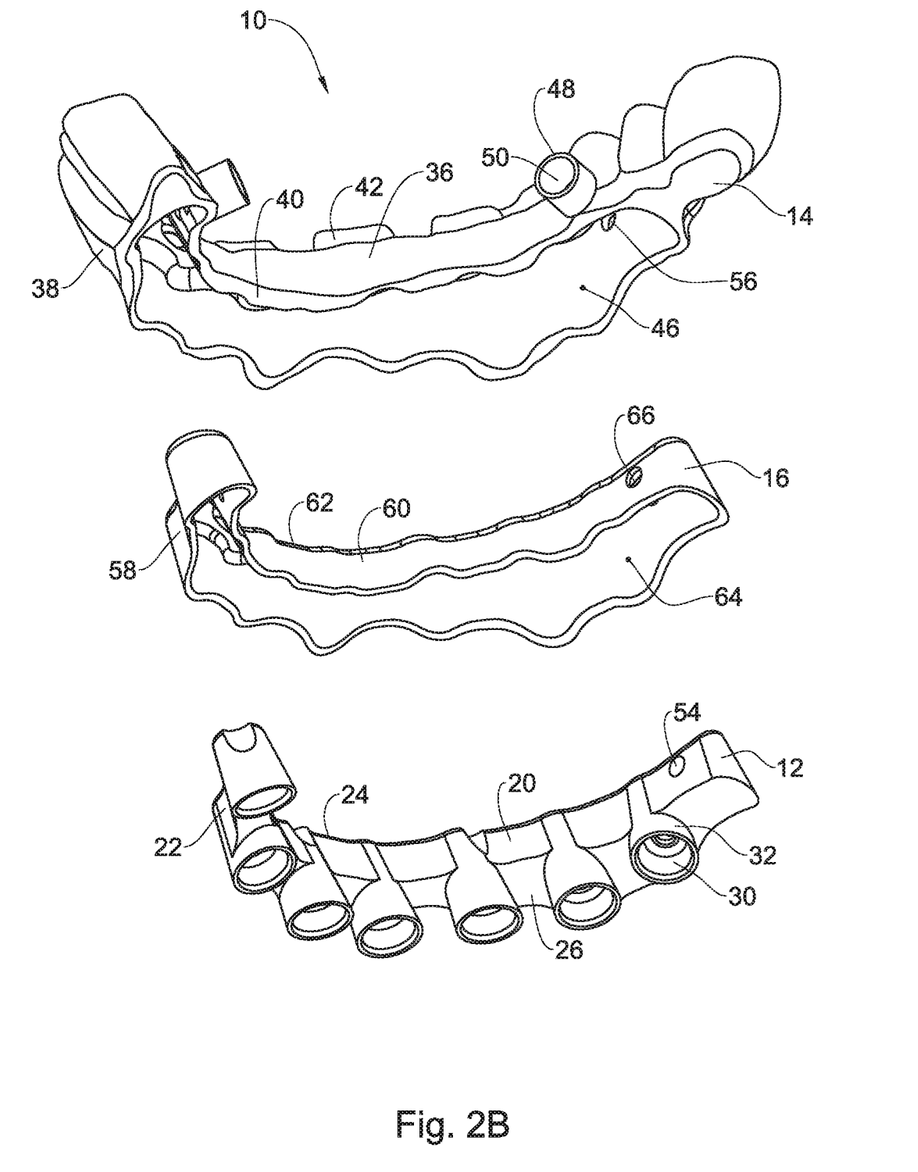
Figure 2C:
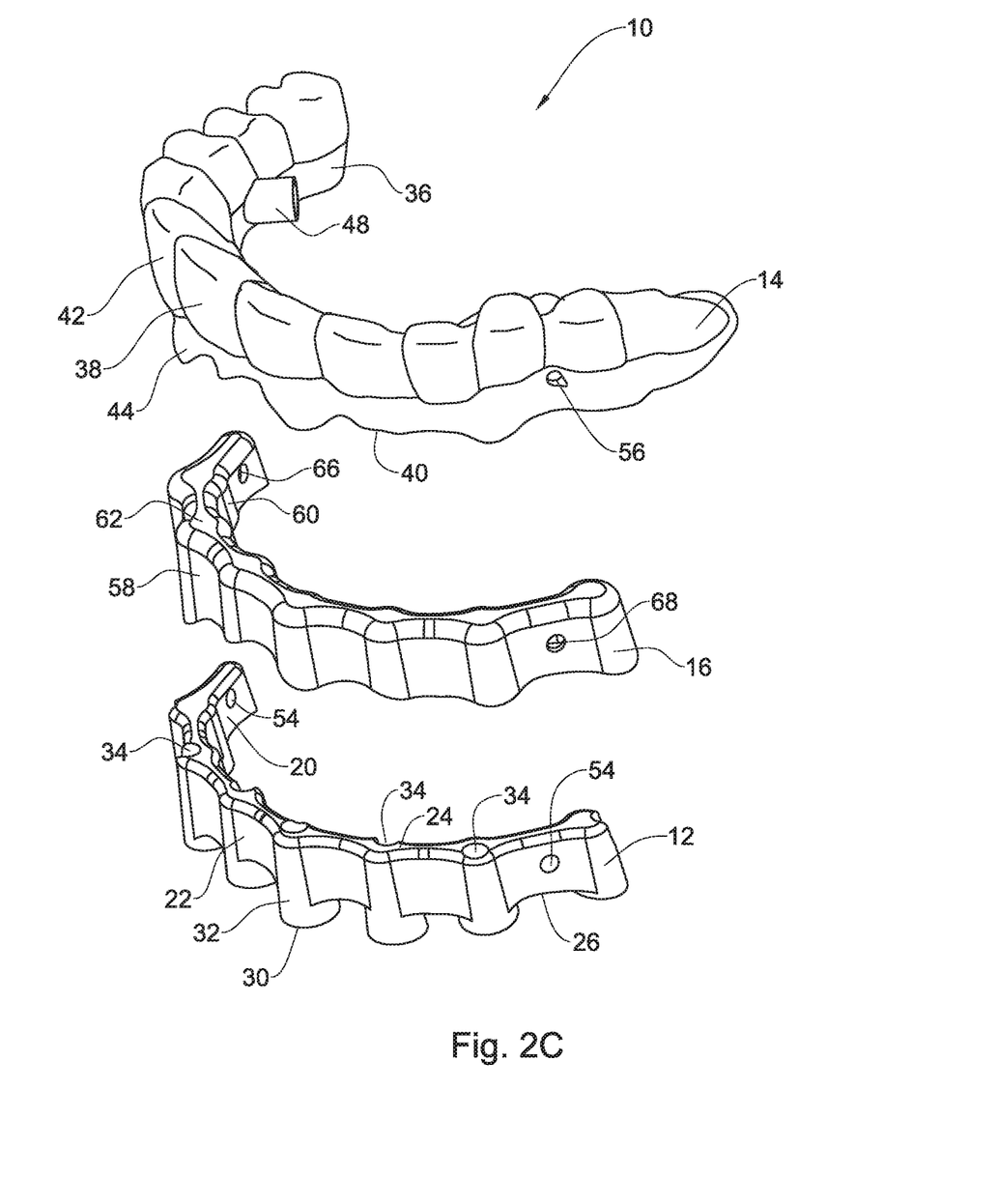

As best seen in FIG. 1B, the buffer insert 16 may be designed to be fully accommodated within the channel 46 of the superstructure 14 (i.e., to not project therefrom) when received therein, for example being flush with the proximal surface 40 thereof, and/or to not extend proximally further than the proximal surface 26 of the support bar 12.

Figure 3:
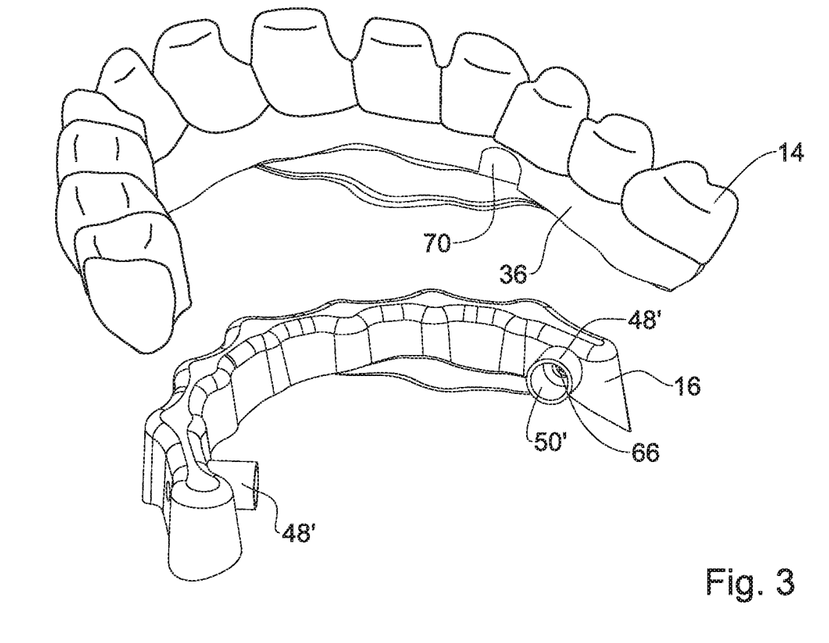
FIG. 3 is a rear top perspective view of a superstructure and buffer insert according to a modification of the dental bridge system illustrated in FIG. 1A.

According to a modification, for example as illustrated in FIG. 3, the buffer insert 16 is formed with lock housings 48', similar to those described above with reference to FIGS. 1A through 2C. Accordingly, the lock housings 48' project internally from a lingual surface of the buffer insert 16, and are each designed to accommodate a locking mechanism. Each of the lock housings 48' may be defined as a cylindrical projection defining a bore 50' passing therethrough about one of the apertures 66 formed in the lingual panel 60 of the to buffer insert 16. The lingual surface 36 of the superstructure 14 is formed with corresponding cutouts 70 to accommodate passage therethrough of the lock housings 48' when the buffer insert 16 is received within the channel 46 of the superstructure 14.

Figure 4:
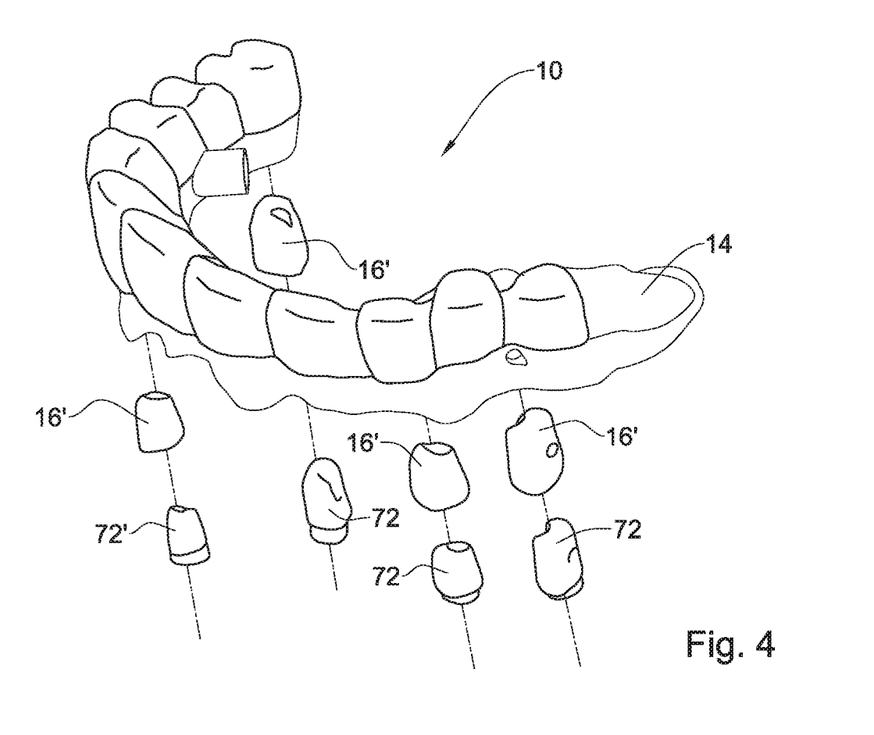
FIG. 4 is a front top perspective view of modification of the dental bridge system illustrated in FIG. 1A.

According to a modification, for example as illustrated in FIG. 4 (in which broken lines indicate relationships between various elements in the assembled position), the support arrangement comprises abutments 72, dental implants (not illustrated) with a suitably formed distal head, or any other arrangement (for convenience, the subsequent description will refer to the illustrated abutment 72; it will be appreciated that dental implant and/or any other suitable arrangement is explicitly included). Accordingly, the buffer inserts 16' are formed as caps, each formed as described above (besides the overall shape thereof), mutatis mutandis. The superstructure 14 may be formed with proximally-facing sockets (not illustrated) on its proximal surface 40 constituting the receiving cavities, and each designed to receive therein one of the abutments 72 (or other suitable arrangement as above) with a corresponding buffer insert 16' thereupon. In order to facilitate maintaining a tight fit between the abutments 72 and the superstructure 14, the outer surface of each buffer insert 16' may be formed so as to conform to the geometry of a corresponding socket formed in the superstructure. In addition, the inner surface of each of the buffer inserts 16' may be formed so as to conform to the geometry of a corresponding abutment 72.

According to some modifications, the buffer insert 16 may comprise only the distal panel 62, such that it sits, when the system 10 is fully assembled, between the distal surface 24 of the support bar 12 and the channel 46 formed in the superstructure. According to other modifications, the buffer insert may comprise only one of the labial and lingual panels 58, 60, or may comprise both the labial and lingual panels connected by thin connecting members passing over the distal surface 24 of the support bar 12, without a full distal panel.

Although the buffer insert 16 as described above with reference to the accompanying drawings is a distinct element, according to some modifications it may be at least partially formed on, or bonded to, surfaces of the channel 46 of the superstructure 14, one or more of the contacting surfaces 20, 22, 24 of the support bar 12, or combinations thereof, in any suitable manner. According to some examples, the buffer insert 16 may be at least partially formed by applying a thin layer of a solvent-carried polymer (such as rubber cement) to one or more of the surfaces of the channel 46, and/or one or more of the contacting surfaces 20, 22, 24 of the support bar 12.

According to some examples, the system 10 may comprise more than one buffer insert 16. For example, the system 10 may comprise a outer buffer insert comprising an outer surface formed so as to conform to the geometry of the channel 46 formed in the superstructure 14, and an inner buffer insert comprising an inner surface defining a channel 64 formed so as to conform to the geometry of the contacting surfaces 20, 22, 24 of the support bar 12, wherein an inner surface of the outer buffer insert defines a channel which is formed so as to conform to an outer surface of the inner buffer insert, such that tight fits are maintained between the superstructure and the outer buffer insert, between the outer and inner buffer inserts, and between the inner buffer insert and the support bar. Each of the inner and outer buffer inserts may be provided according to any one or more of the examples and/or modifications disclosed herein, mutatis mutandis.

It will be appreciated that the buffer insert 16 as described above may be provided separately from a dental bridge system, for example configured for use with an existing and/or independently-sourced system, and customized therefor.

It will be further appreciated that portions of the system 10, including, but not limited to, the support bar 12, superstructure 14, implants, teeth- and gum-mimicking portions 42, 44, and locking arrangements, may be provided in accordance with suitable portions of the disclosure of any one or more of WO 2006/103648, WO 2011/030342, US 2015/0164620, WO 2012/049672, US 2013/0323679, WO 2013/021386, U.S. Provisional application 62/127,864 filed on Apr. 3, 2015, and International Application PCT/IL2016/050043 filed on Jan. 14, 2016, alone or in combination, the full contents of which are incorporated herein by reference, without departing from the scope of the presently disclosed subject matter, mutatis mutandis.

Those skilled in the art to which this invention pertains will readily appreciate that numerous changes, variations, and modifications can be made without departing from the scope of the presently disclosed subject matter, mutatis mutandis.

The invention claimed is:
1. A dental bridge system comprising:
   a superstructure having a teeth-mimicking portion at a distal end thereof, and at least one receiving cavity formed on a proximal side thereof;
   a support arrangement configured for being fixedly secured, at a proximal side thereof, to an alveolar ridge of an individual, and being formed so as to be received, at a distal side thereof, within one of said receiving cavities to facilitate carrying of the superstructure, wherein the support arrangement comprises a plurality of proximally-facing bores each formed within a plurality of positioning posts of the support arrangement;
   a buffering arrangement disposed between the superstructure and the support arrangement, said buffering arrangement being configured to damp shock impulses between said support arrangement and said superstructure; and a locking system having at least one locking pin for passing through the superstructure, the support arrangement, and the buffering arrangement, wherein the locking system includes lock-housings each formed as a cylindrical projection defining a bore passing therethrough, wherein said buffering arrangement, said superstructure and said support arrangement each have corresponding apertures that correspond to one another to accommodate passage therethrough of said at least one locking pin when the buffering arrangement and superstructure are fully received with the support arrangement, and wherein the at least one locking pin is configured to be removable, such that the superstructure and support arrangement are removable from one another.

2. The dental bridge system according to claim 1, wherein an outer surface of said buffering arrangement is shaped so as to conform to the shape of a contacting surface of said receiving cavity of the superstructure.

3. The dental bridge system according to claim 1, wherein an inner surface of said buffering arrangement is shaped so as to conform to the shape of a contacting surface of said support arrangement.

4. The dental bridge system according to claim 1, wherein said buffering arrangement comprises an outer buffer insert and an inner buffer insert, and separate from said superstructure and support arrangement.

5. The dental bridge system according to claim 4, wherein said buffer insert comprises a secondary receiving cavity configured to receive therein the support structure.

6. The dental bridge system according to claim 4, wherein said buffer insert is made of a polymer material is selected from a group consisting of polyetheretherketone, polyisocyanurate, polyaryletherketone, titanium, and combinations thereof.

7. The dental bridge system according to claim 4, wherein the buffer insert is made from a material different from that of at least one of the superstructure and the support structure.

8. The dental bridge system according to claim 4, wherein said buffering arrangement further comprises an auxiliary buffer insert nested within each of at least one of said buffer inserts.

9. The dental bridge system according to claim 8, wherein an inner surface of said buffer insert is shaped so as to conform to a contacting outer surface of its corresponding auxiliary buffer insert.

10. The dental bridge according to claim 1, wherein said buffering arrangement is formed by application of a solvent-carrying polymer on one or more selected from the group including the receiving cavity of the superstructure and an outer surface of the support structure.

11. The dental bridge system according to claim 1, wherein said buffering arrangement comprises labial and lingual buffering surfaces, wherein said buffering to arrangement is free of a distal buffering surface, said labial and lingual buffering surfaces being connected by one or more connecting members passing over said distal surface.

12. The dental bridge system according to claim 1, wherein said buffering arrangement comprises a distal buffering surface.

13. The dental bridge system according to claim 1, wherein said support structure comprises a support bar formed to substantially follow at least a portion of said alveolar ridge.

14. The dental bridge system according to claim 1, wherein said support structure comprises a plurality of abutments configured for being fixedly secured to said alveolar ridge.

15. The dental bridge system according to claim 1, wherein the lock-housings terminate in an aperture connecting the bore and the support structure.

16. The dental bridge system according to claim 1, wherein the aperture is through-going.

17. The dental bridge system according to claim 1, further comprising auxiliary apertures formed in the labial surface of the superstructure.

18. The dental bridge system according to claim 17, wherein the auxiliary apertures are configured to align with labial-facing openings the apertures of the support bar.

19. The dental bridge system according to claim 18, wherein the locking pins are configured to be pushed through the apertures in a lingual direction.

* * * * *